UNITED STATES PATENT OFFICE.

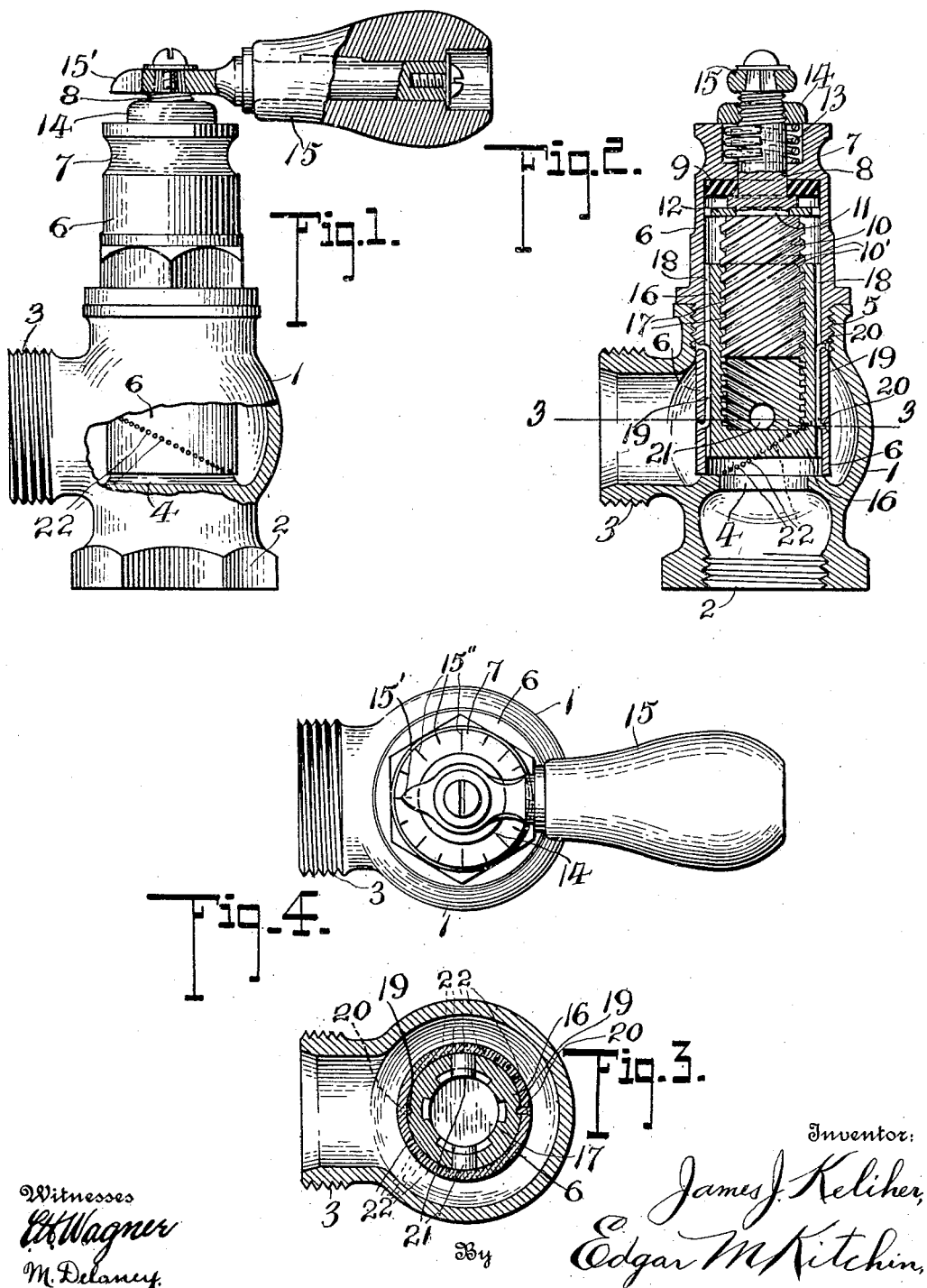
J. J. KELIHER.
VALVE.
APPLICATION FILED JULY 8, 1915.
1,245,735.
Patented Nov. 6, 1917.

JAMES J. KELIHER, OF COUNCIL BLUFFS, IOWA, ASSIGNOR TO THE PAXTON-MITCHELL COMPANY, OF OMAHA, NEBRASKA, A CORPORATION OF NEBRASKA.

VALVE.

1,245,735.      Specification of Letters Patent.      Patented Nov. 6, 1917.

Application filed July 8, 1915. Serial No. 38,817.

*To all whom it may concern:*

Be it known that I, JAMES J. KELIHER, a citizen of the United States, residing at Council Bluffs, in the county of Pottawattamie and State of Iowa, have invented certain new and useful Improvements in Valves; and I do hereby declare the following to be a full, clear, and exact description of the invention, such as will enable others skilled in the art to which it appertains to make and use the same.

This invention relates to improvements in valves for heating systems, and more particularly to those for controlling the supply of vapor in radiators.

One of the objects in view is the provision of apparatus designed to avoid inaccuracies in the relative location of parts.

A further object in view is the incorporation of comparatively simple and inexpensive parts, in such combined relation as to effect easy and perfect control of the passage of vapor through the structure.

With these and further objects in view, as will in part hereinafter become apparent, and in part be stated, the invention comprises certain novel constructions, combinations, and arrangements of parts as will be subsequently in part rendered obvious, and in part specifically stated.

In the accompanying drawing:

Figure 1 is a view in side elevation of a valve structure embodying the features of the present invention, parts being broken away to disclose interior structure.

Fig. 2 is a longitudinal, vertical, central section through the parts seen in Fig. 1.

Fig. 3 is a transverse section taken on the plane indicated by line 3—3 of Fig. 2, and looking downward.

Fig. 4 is a top plan view of the structure.

Referring to the drawing by numerals, 1 indicates the usual globular valve casing having the pipe connection 2, and union connection 3, through which the vapor is designed to pass on its way to the radiator, and while so passing, finding its way through the opening of the valve seat 4 in casing 1 subject to control by apparatus later described. Axially alined with the opening in the seat 4 and spaced above the same, is the threaded opening 5, of valve casing 1.

Threaded into the opening 5 is a cylindrical or tubular valve jacket 6, which is partly closed at its upper end by a head 7, through which head extends a shank 8 journaled in the head and preferably forming a non-leaking joint therewith by the aid of a gasket 9.

The lower end of the shank 8 is formed integral with the threaded body of shaft 10, the said shaft 10 being of greater diameter than the shank, which leaves an annular shoulder engaging the under face of the gasket 9, the upper face of the gasket engaging the under face of the head 7. The shaft 10 is also formed with an annular groove 11 into which is set a cut washer 12 for aiding in maintaining the alinement of the parts. The outer portion of head 7 is recessed about the shank 8, and a coiled spring 13 surrounds the shank within said recess and is retained in place by a nut 14 threaded on to the outer portion of shank 8 and compressing the spring within its recess so as to cause the spring to exert an axially directed pressure upward for maintaining the effective engagement between the gasket 9 and contacting parts. The extreme upper end portion of shank 8 is squared or otherwise formed polygonal. The squared portion is engaged by an operating handle 15, which is provided with an indicating pointer 15′ adapted to coöperate with graduations 15″ formed on the upper end of head 7 for indicating the relative location of the parts controlled by the shaft of the shank 8 as hereinafter specified.

The shaft 10 is provided with a plurality of high pitched threads 10′, 10′. A multiple number of threads is employed merely for the provision of additional strength, and the mechanical action is the same as if a single thread were employed of the pitch indicated, all of the threads being parallel. Snugly fitting within the cylindrical bore of the jacket 6 is a cylindrical valve 16, which is axially bored from its upper end down to a point near its lower end and internally threaded as at 17, with threads corresponding to and adapted to mesh with the threads 10′.

The cylindrical valve 16 is formed with longitudinal grooves 18, 18, disposed to accommodate longitudinal beads or feathers 19, fixed to and extending in from and extending longitudinally of the inner surface of the walls of jacket 6. The said beads 19 may, of course, be constructed in various ways, but a convenient and preferable manner of construction consists in the forming of apertures 20 through the walls of the jacket 6 and the placing of rods within the jacket with their ends turned outward through the apertures 20 and secured therein by peening the outer extremity of said ends.

The valve cylinder 16 is preferably formed of a soft metal, such as a lead compound, so as to insure a non-corrosive valve adapted to accommodate itself to any slight irregularities of its seat, and to insure a vapor tight joint at all times. At the same time, the form of the valve body and its method of mounting, insures against accidental dislocation or error in applying the parts originally in proper position, and also insures against the binding of the parts in use and the resulting breaking of the shank 8 or connected parts.

Apertures 21 are provided through the walls of valve cylinder 16 at the base of the bore thereof, for enabling drainage of water of condensation finding its way into said bore.

The lower end of the jacket 6 extends into non-leaking contact with the upper face of the valve seat 4. Rows of apertures 22 are formed in the jacket 6 along that portion of the jacket past which the lower face of the valve 16 is adapted to move, so that when heat is required, the valve 16 is moved up into the jacket, and thus certain of the apertures 22 are exposed and allow the passage of quantities of vapor. The amount of vapor permitted to pass may be increased at will by the continued elevation of the valve 16 until the valve reaches the limit of its upward movement, at which point, the sum of the areas of the several apertures 22 will be equal to the area of the bore in the valve seat 4, and thus the maximum supply of vapor is provided.

It will, of course, be obvious that the manner of elevating the valve 16 is by swinging the handle 15 for rotating the shaft 10, the intermeshing threads causing the valve 16 to travel axially since it cannot revolve, and the pitch of the threads being such as to insure the full axial travel of the valve 16 within one rotation of the shaft 10. The degree to which the valve is opened may thus be observed by the location of the handle, or more accurately, by the relative location of the pointer 16 with respect to graduations 15''. The closing of the valve for shutting off the vapor consists merely of the reverse action, and the cutting off of the vapor will be similarly proportional to the extent of movement of the valve 16.

What I claim is:

1. The combination with a valve casing having a seat, of a valve jacket extending to the seat at one end within the casing, being formed with a cylindrical bore and having a reduced opening in its opposite end, a cylindrical valve snugly fitting within the bore of the jacket and having an internally threaded bore at its outer end, an externally threaded shaft engaging in said cylindrical threaded valve and having a reduced portion extending through the reduced opening in the valve jacket, a spring mounted on the outer end of the shaft and adapted to bear against the adjacent end of the jacket to urge the shaft outwardly through the jacket, a packing washer carried by the shaft and adapted to bind against the outer end of the jacket to seal the shaft therein, and a centering disk carried upon the shaft in spaced relation to said gasket and adapted to maintain the shaft in true axial relation in the jacket.

2. In a valve structure, the combination with a valve jacket having a cylindrical bore, a bead secured to the jacket at its outer surface and extending axially of and within the bore and engaging the inner face of the jacket, a cylindrical valve snugly fitting in the bore of said jacket and having an axially extending groove snugly receiving said bead, the valve being formed with an axial, threaded bore, and a rotatably mounted, axially extending, threaded shaft, having its threads meshing with the threads of the valve.

3. In a valve structure, the combination with a valve jacket having a cylindrical bore, a bead extending axially of and within the bore and engaging the inner face of the jacket, a cylindrical valve snugly fitting in the bore of said jacket and having an axially extending groove snugly receiving said bead, the valve being formed with an axial, threaded bore, and a rotatably mounted, axially extending, threaded shaft, having its threads meshing with the threads of the valve, the said bead being formed of a rod having its ends turned outward through the wall of the jacket and peened at their outer extremities.

In testimony whereof I affix my signature in presence of two witnesses.

JAMES J. KELIHER.

Witnesses:
JAMES J. PAXTON,
CHAS. L. DUNDEY.

Copies of this patent may be obtained for five cents each, by addressing the "Commissioner of Patents, Washington, D. C."